United States Patent
Yoshii

(10) Patent No.: US 8,285,436 B2
(45) Date of Patent: Oct. 9, 2012

(54) VEHICLE STATE JUDGING APPARATUS AND VEHICLE STATE JUDGING METHOD

(75) Inventor: Yuji Yoshii, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 69 days.

(21) Appl. No.: 13/000,671

(22) PCT Filed: Mar. 6, 2009

(86) PCT No.: PCT/JP2009/054312
§ 371 (c)(1),
(2), (4) Date: Dec. 22, 2010

(87) PCT Pub. No.: WO2010/100760
PCT Pub. Date: Sep. 10, 2010

(65) Prior Publication Data
US 2011/0106369 A1    May 5, 2011

(51) Int. Cl.
*G01M 17/00* (2006.01)
(52) U.S. Cl. .................. 701/29.1; 477/74
(58) Field of Classification Search .......... 701/29, 701/29.1
See application file for complete search history.

(56) References Cited

U.S. PATENT DOCUMENTS

| | | | |
|---|---|---|---|
| 5,895,435 A * | 4/1999 | Ohta et al. | 701/59 |
| 6,339,968 B1 * | 1/2002 | Nagashima | 74/473.25 |
| 6,782,961 B1 | 8/2004 | Ishikawa et al. | |
| 7,076,355 B2 * | 7/2006 | Ota et al. | 701/51 |
| 2003/0229437 A1 | 12/2003 | Joe et al. | |
| 2003/0232680 A1 * | 12/2003 | Matsunaga et al. | 475/131 |
| 2004/0138024 A1 * | 7/2004 | Kano et al. | 477/74 |
| 2005/0096821 A1 * | 5/2005 | Tamaru et al. | 701/51 |
| 2006/0014610 A1 * | 1/2006 | Matsunaga et al. | 477/121 |

FOREIGN PATENT DOCUMENTS

| | | |
|---|---|---|
| JP | 6-284510 | 10/1994 |
| JP | 7-117645 | 5/1995 |
| JP | 9 287962 | 11/1997 |
| JP | 2000 318588 | 11/2000 |
| JP | 2001 116129 | 4/2001 |
| JP | 2002 236133 | 8/2002 |
| JP | 2004 150456 | 5/2004 |

OTHER PUBLICATIONS

International Search Report issued Jun. 16, 2009 in PCT/JP09/54312 filed Mar. 6, 2009.

* cited by examiner

*Primary Examiner* — Behrang Badii
*Assistant Examiner* — Shardul Patel
(74) *Attorney, Agent, or Firm* — Oblon, Spivak, McClelland, Maier & Neustadt, L.L.P.

(57) ABSTRACT

A vehicle state judging apparatus includes a wheel speed sensor provided on a vehicle detecting a wheel speed, a shift position sensor detecting a position of a shift lever, an acceleration sensor detecting acceleration acting on the vehicle, and a judging unit judging a vehicle state from detection values of the wheel speed sensor, the shift position sensor and the acceleration sensor. The judging unit judges that a travel direction of the vehicle is switched when the judging unit detects that the shift lever is switched from a position other than forward movement to a position of the forward movement or switched from a position other than backward movement to a position of the backward movement, detects that the wheel speed is not lower than a first reference speed, and further detects that the wheel speed becomes not higher than a second reference speed before the moment of detection.

17 Claims, 5 Drawing Sheets

VEHICLE STATE JUDGING APPARATUS AND VEHICLE STATE JUDGING METHOD

TECHNICAL FIELD

The present invention relates to a vehicle state judging apparatus and a vehicle state judging method for judging whether a vehicle moves forward or backward.

BACKGROUND ART

The vehicle such as an automobile corrects inner and outer wheels at the time of turn based on a yaw rate of the vehicle in order to correct a wheel speed. Herein, a value of the yaw rate of the vehicle differs depending on whether the vehicle moves forward or backward even at the same vehicle speed. Therefore, a device for detecting whether the vehicle moves forward or backward is proposed in order to correctly calculate the yaw rate of the vehicle.

For example, the patent literature 1 discloses a forward movement judging device including rotational number detecting means for detecting a rotational number of an engine and a vehicle speed detecting means for detecting a vehicle speed. The forward movement judging device estimates a transmission ratio of the traveling vehicle by a transmission ratio estimating means based on detection results of the vehicle speed and the engine rotational number, judges that the vehicle is traveling forward by a forward movement judging means when the estimated transmission ratio is the transmission ratio on a side of a high rotational output which is the closest to the transmission ratio at the time of the backward movement or higher than the same out of a plurality of transmission ratios of a transmission device, and judges that the vehicle travels forward until the vehicle stops even when the transmission ratio changes thereafter in order to provide the forward movement judging device of the vehicle capable of easily and surely judging whether the vehicle travels forward.

Also, the patent literature 2 discloses a behavior control device that inhibits an execution of a behavior control for forward movement. The behavior control device judges whether the vehicle is in a backward movement state based on a vehicle speed and a shift position, judges whether there is a possibility that the vehicle is in the backward movement state when it is judged that the vehicle is not in the backward movement state, judges whether the vehicle is in a forward movement state when it is judged that there is possibility that the vehicle is in the backward movement state, allows execution of behavior control for the forward movement by setting a flag to 1 when it is judged that the vehicle is in the forward movement state and resetting the flag to 0 when it is judged that the vehicle is not in the forward movement state.

Patent Literature 1: Japanese Patent Application Laid-open No. 2002-236133
Patent Literature 2: Japanese Patent Application Laid-open No. 2000-318588

DISCLOSURE OF INVENTION

Problems to be Solved by the Invention

The forward movement state can be correctly judged when the vehicle largely moves based on calculation results of the vehicle speed and the engine rotational number as disclosed in the patent literature 1 and by estimating the forward movement state from the shift position as disclosed in the patent literature 2. However, at the time of the travel at a low speed, at the time of the travel at a low rudder angle, and especially in a transient state in which a transmission position is switched from the transmission position to move forward to the transmission position to move backward, it is not possible to correctly judge whether the vehicle is in the forward movement state or the backward movement state only by the shift position. When calculating by the relationship between the vehicle speed and the engine rotational number also, it is necessary to travel at a certain speed or faster, so that it is difficult to judge whether the vehicle moves forward or backward at the time of a travel at the low speed, at the time of a travel at the low rudder angle, and especially in the transient state in which the transmission position is switched from the transmission position to move forward to the transmission position to move backward.

The present invention is achieved in view of the above description and an object thereof is to provide the vehicle state judging apparatus and the vehicle state judging method capable of detecting whether the vehicle moves forward or backward correctly and easily in a short time.

Means For Solving Problem

In order to solve the above mentioned problem and achieve the object, a vehicle state judging apparatus according to the present invention for judging a travel state of a vehicle traveling by a prime mover, includes a wheel speed sensor that is provided on the vehicle and detects a wheel speed; a shift position sensor that detects a position of a shift lever; and a judging unit that judges a vehicle state based on detection values of the wheel speed sensor and the shift position sensor, wherein the judging unit judges that a travel direction of the vehicle is switched when the judging unit detects that the shift lever is switched from a position other than forward movement to a position of the forward movement or switched from a position other than backward movement to a position of the backward movement, detects that the wheel speed is not lower than a first reference speed, and further detects that the wheel speed becomes not higher than a second reference speed before the moment of detection.

Further, it is preferable that the judging unit judges that the travel direction of the vehicle is switched when the judging unit further detects that the wheel speed becomes not higher than the second reference speed within a reference time range from the moment of detection. In addition, it is preferable that the second reference speed is a wheel speed at which it can be considered that the vehicle stops.

Further, it is preferable that the vehicle state judging apparatus further includes an acceleration sensor that detects acceleration acting on the vehicle, and the judging unit judges that the travel direction of the vehicle is switched when the judging unit further detects that the acceleration is not higher than reference acceleration. In addition, it is preferable that the judging unit judges that the travel direction of the vehicle is switched when the judging unit detects a condition to judge that the travel direction of the vehicle is switched not less than a certain number of times within a certain time period.

In addition, in order to solve the above mentioned problem and achieve the object, a vehicle state judging method according to the present invention for judging a travel state of a vehicle, includes a detecting step that detects whether a shift lever is switched from a position other than forward movement to a position of the forward movement or switched from a position other than backward movement to a position of the backward movement; a wheel speed judging step that judges whether a wheel speed is not lower than a first reference speed when switching of the position is detected at the detecting step; a stop judging step that judges whether the wheel speed becomes not higher than a second reference speed before the wheel speed judging step when it is judged that the wheel speed is not lower than the reference speed at the wheel speed judging step; an acceleration judging step that judges whether acceleration of the vehicle is not higher than reference acceleration when it is judged that the wheel speed becomes not higher than the second reference speed within a reference time range at the stop judging step; and a travel direction judging step that judges that a travel direction of the vehicle is switched when it is judged that the acceleration is not higher than the reference acceleration at the acceleration judging step.

Here, it is preferable that the stop judging step judges whether the wheel speed becomes not higher than the second reference speed within the reference time range before the wheel speed judging step. In addition, it is preferable that the acceleration judging step judges whether the acceleration of the vehicle is not higher than the reference acceleration until it is judged that the acceleration of the vehicle is not higher than the reference acceleration a certain number of times, and thereafter shifts to the stop judging step.

In addition, it is preferable that the second reference speed is a wheel speed at which it can be considered that the vehicle stops.

Effect of the Invention

The vehicle state judging apparatus and the vehicle state judging method according to the present invention have an effect to correctly judge the travel direction of the vehicle even just after switching of the shift position and at the time of a travel at a low speed.

EXPLANATION OF LETTERS OF NUMERALS

Figure 1:
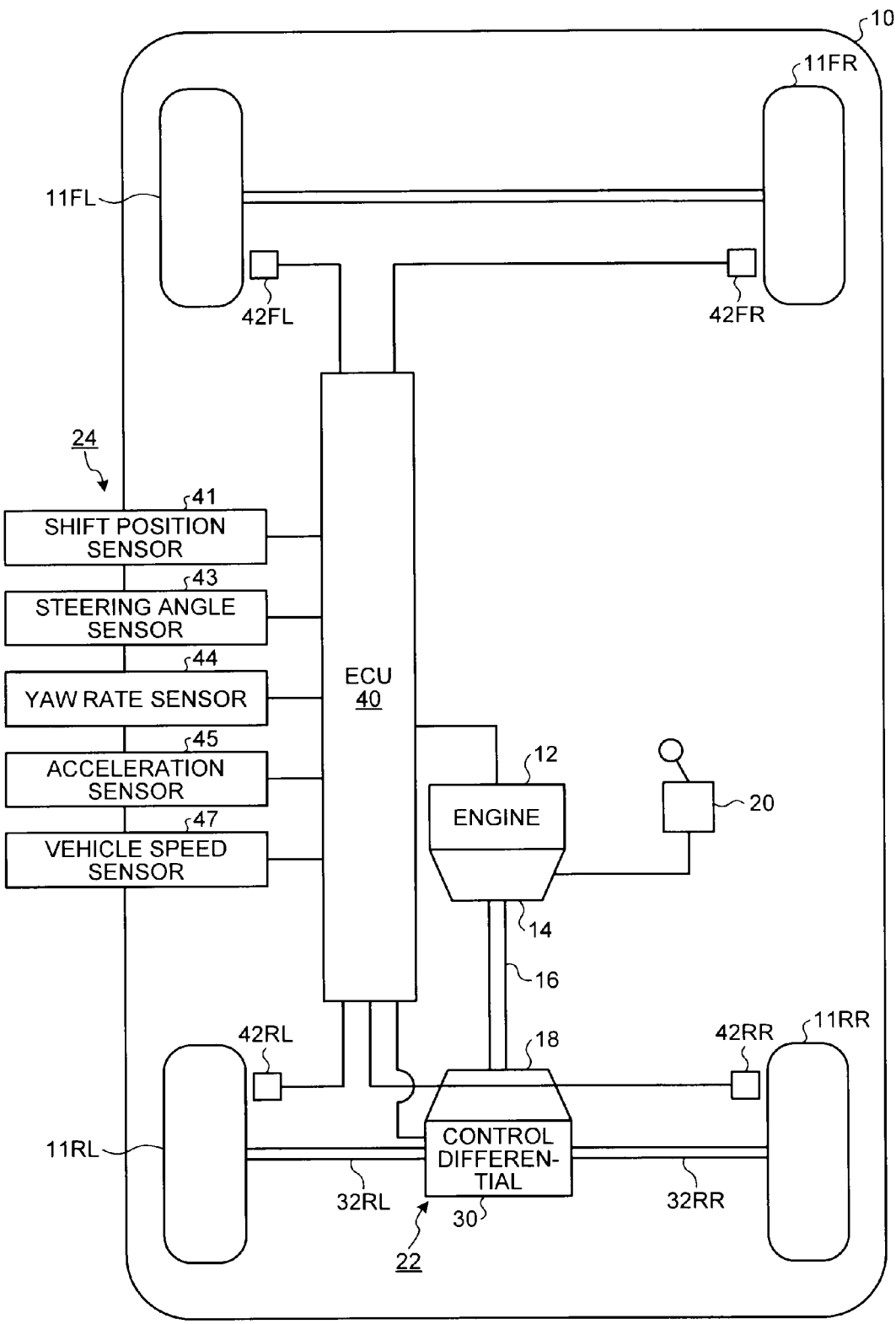
FIG. 1 is a block diagram illustrating a schematic configuration of one embodiment of a vehicle including a vehicle state judging apparatus.

10 Vehicle
11FR, 11FL, 11RR, 11RL Wheel
12 Engine
14 Transmission
16 Propeller shaft
18 Viscous coupling
20 Shift lever
22 Driving force distribution controlling device
24 Vehicle state judging apparatus
30 Control differential
32RR, 32RL Drive shaft
40 ECU
41 Shift position sensor
42FR, 42FL, 42RR, 42RL Wheel speed sensor
43 Steering angle sensor
44 Yaw rate sensor
45 Acceleration sensor
47 Vehicle speed sensor

BEST MODE(S) FOR CARRYING OUT THE INVENTION

The present invention is hereinafter described in detail with reference to the drawings. Meanwhile, the present invention is not limited by the description of embodiments of the present invention (hereinafter, referred to as an embodiment). Also, components in the following embodiment include a component easily conceived of by one skilled in the art, a substantially identical component, and a component in a so-called equivalent scope. For example, although the present invention is described as a vehicle driven by an internal-combustion engine in the following embodiment, this can be used also in a hybrid vehicle driven by the internal-combustion engine and a motor, an electric vehicle driven by the motor rotated by electricity and the like.

FIG. 1 is a block diagram illustrating a schematic configuration of one embodiment of the vehicle provided with a vehicle state judging apparatus according to this embodiment. A vehicle 10 illustrated in FIG. 1 includes wheels 11FR, 11FL, 11RR and 11RL, an engine 12, a transmission 14, a propeller shaft 16, a viscous coupling 18, a shift lever 20, a driving force distribution controlling device 22, and a vehicle state judging apparatus 24. Meanwhile, the vehicle 10 includes various components as the vehicle such as the vehicle, an accelerator pedal, and a brake pedal in addition to the above-described components.

The wheels 11FR, 11FL, 11RR and 11RL are arranged on four sides of the vehicle 10 in which the wheels 11FR and 11FL are front wheels when the vehicle 10 travels in a forward direction and the wheels 11RR and 11RL are rear wheels when the vehicle 10 travels in the forward direction. Also, in this embodiment, the wheels 11FL and 11FL are steering wheels whose steering angle is changed by handle operation and the like, and the wheels 11RR and 11RL are drive wheels connected to the engine 12 through a drive shaft to which driving force is transmitted from the engine 12.

The engine 12, which is the internal-combustion engine, allows a piston to reciprocate in a central axis direction of a cylinder formed into a cylindrical shape by burning fuel, thereby outputting rotation from a crankshaft for converting reciprocatory motion of the piston to rotary motion.

The transmission 14 connected to the engine 12 through the crankshaft changes torque by transmission shift of mechanical power transmitted from the crankshaft. The transmission 14 is composed of a plurality of transmission positions for forward movement with different transmission ratios and at least one transmission position for backward movement. The transmission 14 is connected to the driving force distribution controlling device 22 through the propeller shaft 16 and the viscous coupling 18.

The shift lever 20 is a lever operated by an operator. When the shift lever 20 is operated by the operator, a shift position sensor 41 to be described later detects the operation of the shift lever 20.

The driving force distribution controlling device 22, which includes a control differential 30 and drive shafts 32RR and 32RL, transmits power transmitted from the transmission 14 to the wheels 11RR and 11RL, which are the drive wheels. The control differential 30 distributes to transmit the power transmitted from the transmission 14 through the propeller shaft 16 and the viscous coupling 18 to the drive shafts 32RR and 32RL. The drive shaft 32RR is a shaft, which connects the control differential 30 to the wheel 11RR, for transmitting the power from the control differential 30 to the wheel 11RR. The drive shaft 32RL is a shaft, which connects the control differential 30 and the wheel 11RL, for transmitting the power from the control differential 30 to the wheel 11RL.

The vehicle state judging apparatus 24 includes an electronic control unit (ECU) 40, the shift position sensor 41 for detecting a shift position input by the shift lever 20, wheel speed sensors 42FR, 42FL, 42RL and 42RL for detecting wheel speeds of the wheels 11FR to 11RL, respectively, a steering angle sensor 43 for detecting the steering angle, a yaw rate sensor 44 for detecting a yaw rate, an acceleration sensor 45 for detecting acceleration acting on the vehicle 10, and a vehicle speed sensor 47 for detecting a vehicle speed. Herein, the acceleration sensor 45 is a sensor capable of detecting not only the acceleration acting on the vehicle 10 by acceleration of the vehicle 10 at the time of the travel but also the acceleration acting on the vehicle 10 by inclination of the vehicle 10.

The ECU 40 judges whether the vehicle 10 is in a state of the forward movement or a state of the backward movement based on detection results of the sensors 41 to 47. The ECU 40 also has a function to drive the engine 12 and the driving force distribution controlling device 22 based on the detection results of the sensors 41 to 47 in addition to a function as the vehicle state judging apparatus 24. In this manner, total driving force control by the engine 12, driving force distribution control by the driving force distribution controlling device 22, and vehicle state judgment by the vehicle state judging apparatus 24 are performed and vehicle motion control is performed by the ECU 40.

Figure 2:
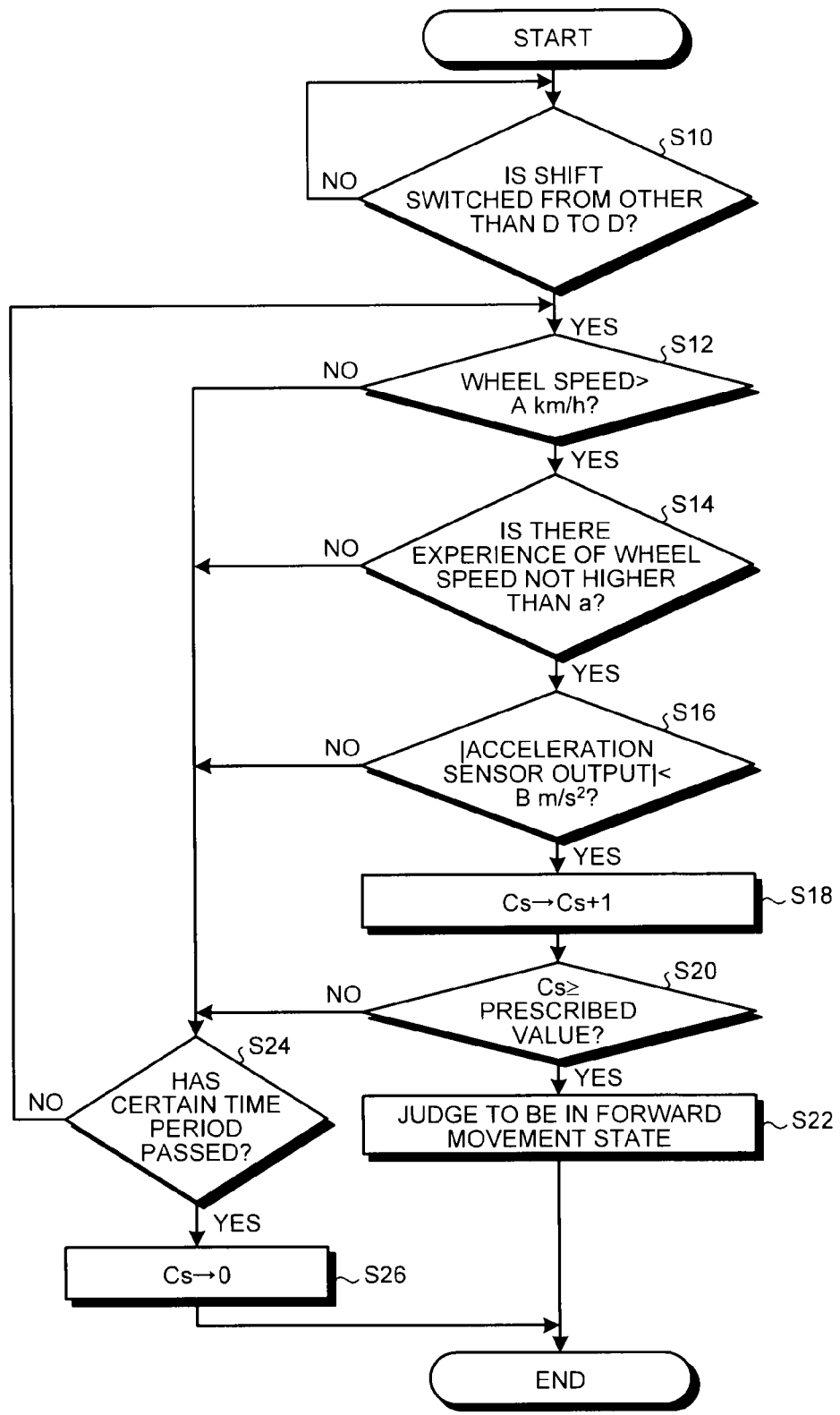
FIG. 2 is a flow diagram illustrating an example of a judging method by the vehicle state judging apparatus.

Next, a judging method of the vehicle state by the vehicle state judging apparatus 24 is described. Herein, FIG. 2 is a flow diagram illustrating an example of the judging method by the vehicle state judging apparatus.

The ECU 40 of the vehicle state judging apparatus 24 judges whether the shift position of the shift lever 20 is switched from a position other than a drive position (D), for example, a reverse position (R) to the drive position (D) based on a detection value detected by the shift position sensor 41 at a step S10. Meanwhile, although the reverse position (R) is illustrated above, it is also possible to switch from a neutral position (N) to the drive position (D). When the ECU 40 judges that the shift position is switched to the drive position at the step S10, this shifts to a step S12, and when this judges that this is not switched, this repeats the step S10.

Next, the ECU 40 judges whether the wheel speed detected by the wheel speed sensors 42FR to 42RL is higher than a wheel speed A km/h (that is to say, whether the wheel speed>A km/h is satisfied) at the step S12. When the ECU 40 judges that the wheel speed>A km/h is satisfied at the step S12, the process goes to a step S14, and when this judges that the wheel speed≦A km/h is satisfied, it proceeds to a step S24. Herein, the wheel speed detected by the wheel speed sensors 42FR to 42RL may be the wheel speed obtained by detecting an average value of the wheel speeds detected by the four sensors or the wheel speed obtained by detecting a minimum wheel speed of the wheel speeds detected by the four sensors. Also, the wheel speed A is a reference wheel speed at which it may be considered that the vehicle 10 travels and an optional wheel speed not lower than 5 km/h and not higher than 10 km/h, for example.

Next, the ECU 40 judges whether there is an experience of the wheel speed not higher than a km/h at the step S14. When the ECU 40 judges that there is the experience of the wheel speed not higher than a km/h at the step S14, the process goes to a step S16, and when this judges that there is not the experience of the wheel speed not higher than a km/h, it proceeds to the step S24. Herein, the experience of the wheel speed not higher than a km/h is intended to mean a fact that the wheel speed becomes not higher than a km/h within a certain time range from the moment of judgment. Herein, the wheel speed a is the reference wheel speed at which it may be considered that the vehicle 10 stops.

Next, the ECU 40 judges whether the acceleration detected by the acceleration sensor 45 is lower than B m/s$^2$ at the step S16. When the ECU 40 judges that an absolute value of the acceleration is lower than B m/s$^2$ at the step S16, the process goes to a step S18, and when this judges that the absolute value of the acceleration is not lower than B m/s$^2$, it proceeds to the step S24. Herein, the acceleration B m/s$^2$ is reference acceleration detected when the vehicle is on a road surface, which is flat to a certain degree. That is to say, when the vehicle 10 is on the road surface, which is flat to a certain degree, the absolute value of the acceleration is lower than B m/s$^2$ and when the vehicle 10 is on a slope not less than a certain degree, the absolute value of the acceleration is not lower than B m/s$^2$.

Next, the ECU 40 makes Cs+1 new Cs at the step S18, that is to say, increments the number of counts of Cs by 1 and shifts to a step S20. Herein, Cs is a counter to count the number of detections and it is set to be Cs=0 at the start. When the ECU 40 increments the number of counts of Cs by 1 at the step S18, this judges whether Cs is not lower than a prescribed value (that is to say, whether Cs≧ the prescribed value is satisfied) at the step S20. When the ECU 40 judges that Cs≧the prescribed value is satisfied at the step S20, the process goes to a step S22, and when this judges that Cs<the prescribed value is satisfied, it proceeds to the step S24.

When the ECU 40 judges that Cs≧the prescribed value is satisfied at the step S20, the ECU 40 judges that the vehicle is in the forward movement state at the step S22 and terminates the process. Also, when the ECU 40 proceeds to the step S24 after negative judgment at each step, the ECU 40 judges whether a certain time period has passed at the step S24. When the ECU 40 judges that a certain time period has passed at the step S24, the process goes to a step S26, and when the ECU 40 judges that a certain time period has not passed, the process goes to the step S12 to repeat the above-described process. Also, when the ECU 40 judges that a certain time period has passed at the step S24, this sets Cs to 0 at the step S26 and thereafter terminates the process.

In this manner, the vehicle state judging apparatus 24 can correctly detect the travel direction even when the shift position and the travel direction are different from each other based on the shift position input from the shift lever 20 and the wheel speed, specifically, by judging whether the shift position is switched and whether the wheel speed is decreased to the speed at which it may be considered that the vehicle stops.

Figure 3:
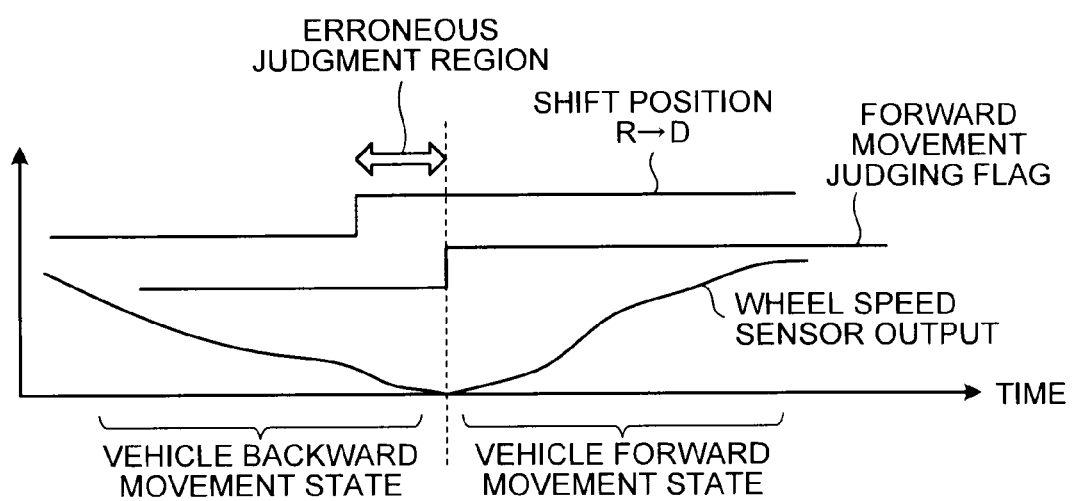
FIG. 3 is an illustrative diagram illustrating the relationship between a detection value of each sensor and judgment by the vehicle state judging apparatus.

Hereinafter, a specific description will be made with reference to FIG. 3. Herein, FIG. 3 is an illustrative diagram illustrating the relationship between the detection value of each sensor and the judgment by the vehicle state judging apparatus. Meanwhile, the illustrative diagram illustrated in FIG. 3 is that of a case where the vehicle travels in the backward direction at a predetermined speed and the shift lever is switched from the reverse position (R: backward movement) to the drive position (D: forward movement). In the case illustrated in FIG. 3, when the travel direction of the vehicle is judged only by the shift position of the shift lever 20, since the shift lever 20 is in the drive position even though the vehicle 10 actually moves backward during a time period from just after the switch to the stop of the vehicle (during an erroneous judgment region illustrated in FIG. 3), it is judged that the vehicle moves forward. When the travel direction is reversed in this manner, since a supposed yaw rate and an actual yaw rate are different from each other, it might be judged that the vehicle does not normally travel even though this normally travels and distribution of the power transmitted from the control differential 30 to each wheel 11RL and 11RR might be reversed from correct distribution. On the other hand, the vehicle state judging apparatus 24 judges the forward movement or sets on a forward movement judging flag in FIG. 3 by detecting that the shift lever 20 is switched to the forward movement and detecting that the wheel speed becomes the speed at which it may be considered that the vehicle stops as illustrated in FIG. 3. According to this, it is possible to more correctly judge whether the vehicle 10 moves forward or backward and inhibit occurrence of erroneous judgment. That is to say, according to this embodiment, it is possible to judge that the vehicle is in the backward movement state even in a time region indicated to be the erroneous judgment region in FIG. 3, thereby inhibiting the occurrence of the erroneous judgment. Also, by detecting the acceleration loaded on the vehicle and by preventing the judgment of the travel direction when the acceleration not lower than certain acceleration acts on the vehicle, for example, when the vehicle is on a steep slope, erroneous detection can be inhibited and the travel direction can be more correctly judged. Specifically, although there is a case where the vehicle slides down to move by an effect of gradient regardless of the shift position when the vehicle is on the steep slope, by detecting the acceleration acting on the vehicle and judging based on the result of detection, it becomes possible to prevent the judgment of the travel direction when there is a possibility of an occurrence of the erroneous detection, thereby more correctly judging the travel direction.

Also, as the process illustrated in FIG. 2, by judging a plurality of times whether the wheel speed and the acceleration applied on the vehicle 10 satisfy conditions at the steps S12, S14 and S16 after detecting the switch of the shift lever 20, the travel state of the vehicle can be more correctly judged. Specifically, even in a case where the acceleration becomes not lower than the reference acceleration by a single judgment due to temporarily sudden acceleration and sudden deceleration even when the vehicle is on the flat surface, it is possible to judge that the condition is satisfied by another judgment, so that the correct travel state can be judged. Meanwhile, although it is preferable to judge a plurality of times for judging the vehicle state more correctly, it is also possible to judge the vehicle state by the single judgment. Although the three judgments at the steps S12, S14 and S16 are repeated in the above-described embodiment, it is also possible to repeat one judgment out of the three judgments or repeat two judgments out of the three judgments.

Although the acceleration loaded on the vehicle is detected and the judgment is prevented when the vehicle is on the steep slope based on the detected acceleration of the vehicle for more correctly detecting the travel direction in the above-described embodiment, the present invention is not a limited by this exemplary example. That is to say, although accuracy is deteriorated, it is also possible to judge based on the shift position of the vehicle (step S10) and the wheel speed (steps S12 and S14) without detecting the acceleration loaded on the vehicle (step S16). Although it is detected whether the wheel speed becomes not higher than a km/h within a certain time range from the moment of the judgment at the step S14 as a reference for detecting the travel direction more correctly, it is not necessary to provide the time range.

Figure 4:
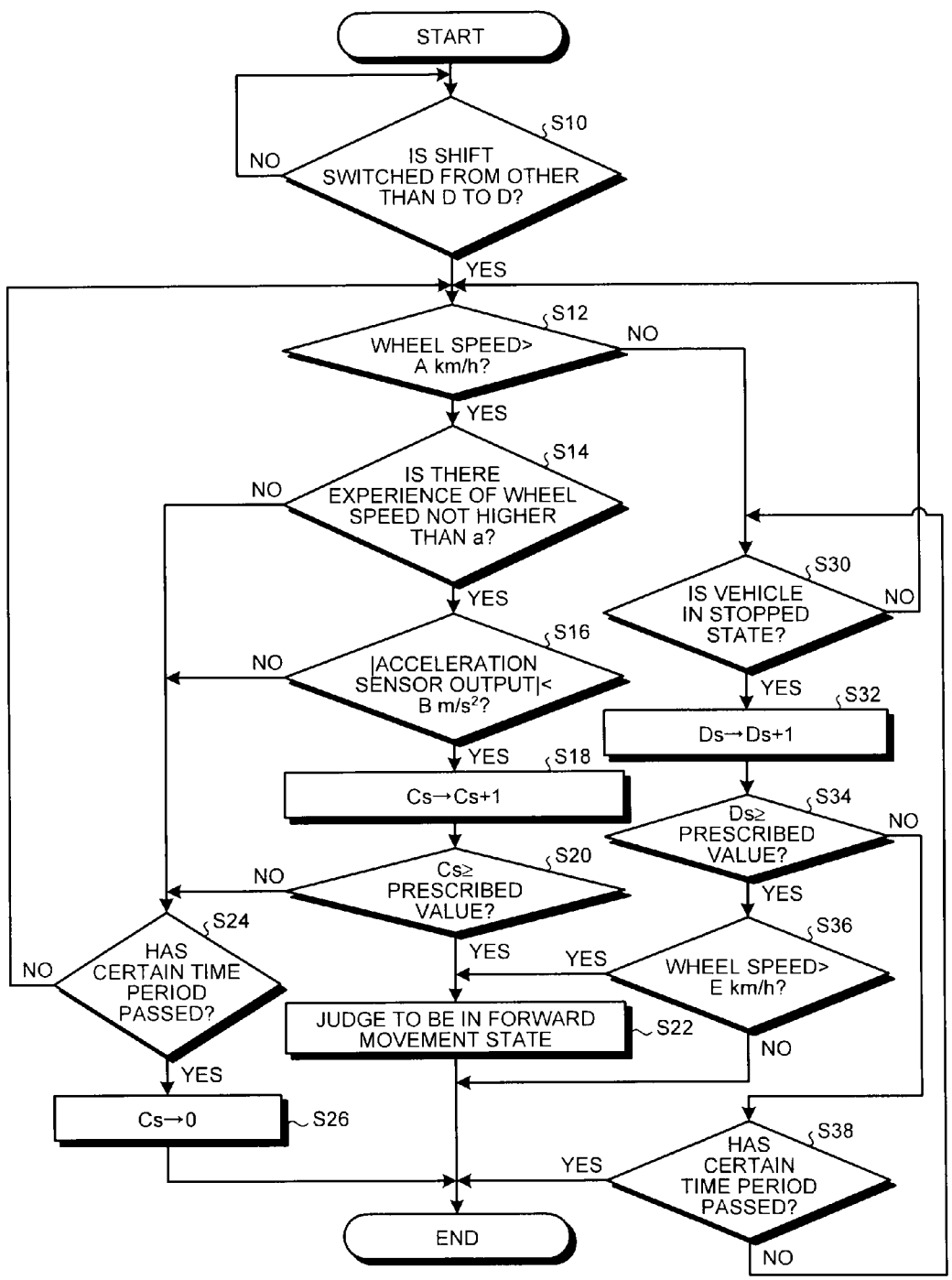
FIG. 4 is a flow diagram illustrating another example of the judging method by the vehicle state judging apparatus.

Herein, although only the control in the case where the wheel speed is not lower than A km/h is illustrated in the example illustrated in FIG. 2, further, it is also possible to judge the travel state of the vehicle also when it may be considered that the vehicle stops. Another example of the judging method by the vehicle state judging apparatus is hereinafter described with reference to FIG. 4. Herein, FIG. 4 is a flow diagram illustrating another example of the judging method by the vehicle state judging apparatus. Meanwhile, the judging method illustrated in FIG. 4 is basically similar to the judging method illustrated in FIG. 2 for the control in the case where the wheel speed is not lower than A km/h, so that the description of the similar part is simplified and a characteristic feature of the judging method illustrated in FIG. 4 is hereinafter described in detail.

First, the ECU 40 of the vehicle state judging apparatus 24 repeats the judgment whether the shift position of the shift lever 20 is switched from the position other than the drive position to the drive position based on the detection value detected by the shift position sensor 41 at the step S10, and when the ECU 40 judges that the shift position is switched to the drive position, the process goes to the step S12. Next, the ECU 40 judges whether the wheel speed detected by the wheel speed sensors 42FR to 42RL is higher than the reference speed A km/h (that is to say, whether the wheel speed>A km/h is satisfied) at the step S12. When the ECU 40 judges that the wheel speed>A km/h is satisfied at the step S12, this shifts to the step S14, and when the ECU 40 judges that the wheel speed≦A km/h is satisfied, the process goes to a step S30. Herein, since the processes at the steps S14, S16, S18, S20, S22, S24 and S26 of the ECU 40 are similar to the above-described process in the flow diagram illustrated in FIG. 2, the description thereof is omitted.

On the other hand, when the ECU 40 judges that the wheel speed≦A km/h is satisfied at the step S12, the ECU 40 judges whether the vehicle 10 is in the stopped state at the step S30. In this case, the ECU 40 judges that the vehicle 10 is in the stopped state when the wheel speed detected by the wheel speed sensors 42FR to 42RL is the speed at which it may be considered that the vehicle stops, more specifically, when the wheel speed is not higher than a km/h, and judges that the vehicle is not in the stopped state when the wheel speed is higher than a km/h, for example. When the vehicle state judging apparatus 24 judges that the vehicle 10 is in the stopped state at the step S30, the process goes to a step S32, and when the vehicle state judging apparatus 24 judges that the vehicle 10 is not in the stopped state, it proceeds to the step S12.

The ECU 40 makes Ds+1 new Ds, that is to say, increments the number of counts of Ds by 1 at the step S32 and shifts to a step S34. In this case, Ds is a counter to count the number of detections and it is set to be Ds=0 at the start. When the ECU 40 increments the number of counts of Ds by 1 at the step S32, this judges whether Ds is not lower than a prescribed value (that is to say, whether Ds the prescribed value is satisfied) at the step S34. When the ECU 40 judges that Ds the prescribed value is satisfied at the step S34, the process goes to a step S36, and when this judges that Ds<the prescribed value is satisfied, it proceeds to a step S38.

When the ECU 40 judges that Ds the prescribed value is satisfied at the step S34, this judges whether the wheel speed detected by the wheel speed sensors 42FR to 42RL is higher than a wheel speed E km/h (that is to say, whether the wheel speed>E km/h is satisfied) at the step S36. Herein, the wheel speed E km/h is the reference wheel speed at which it may be judged that the vehicle 10 is in the travel state, and this may be the same wheel speed as the wheel speed A km/h or a separately set reference wheel speed. Meanwhile, at the step S36, it is judged by detecting the wheel speed during a certain time period and detecting whether the wheel speed>E km/h is satisfied during the certain time period. When the ECU 40 judges that the wheel speed>E km/h is satisfied at the step S36, this shifts to the step S22, and when this judges that the wheel speed≦E km/h is satisfied, the process is terminated. Also, when the ECU 40 judges that the wheel speed>E km/h is satisfied at the step S36, this judges that the vehicle is in the forward movement state at the step S22 and the process is terminated.

On the other hand, when the ECU 40 judges that Ds<the prescribed value is satisfied at the step S34, the ECU 40 judges whether a certain time period has passed at the step S38. When the ECU 40 judges that a certain time period has passed at the step S38, the ECU 40 terminates the process. When this judges that a certain time period has not passed, on the other hand, the process goes to the step S30 and the ECU performs the above-described processes from the step S30.

In this manner, by judging whether the vehicle is in the stopped state at the time of switching of the shift position and by judging whether the vehicle is switched from the stopped state to the travel state when the vehicle is in the stopped state, the travel direction can be judged with high degree of accuracy even when the shift position is switched in the stopped state.

Figure 5:
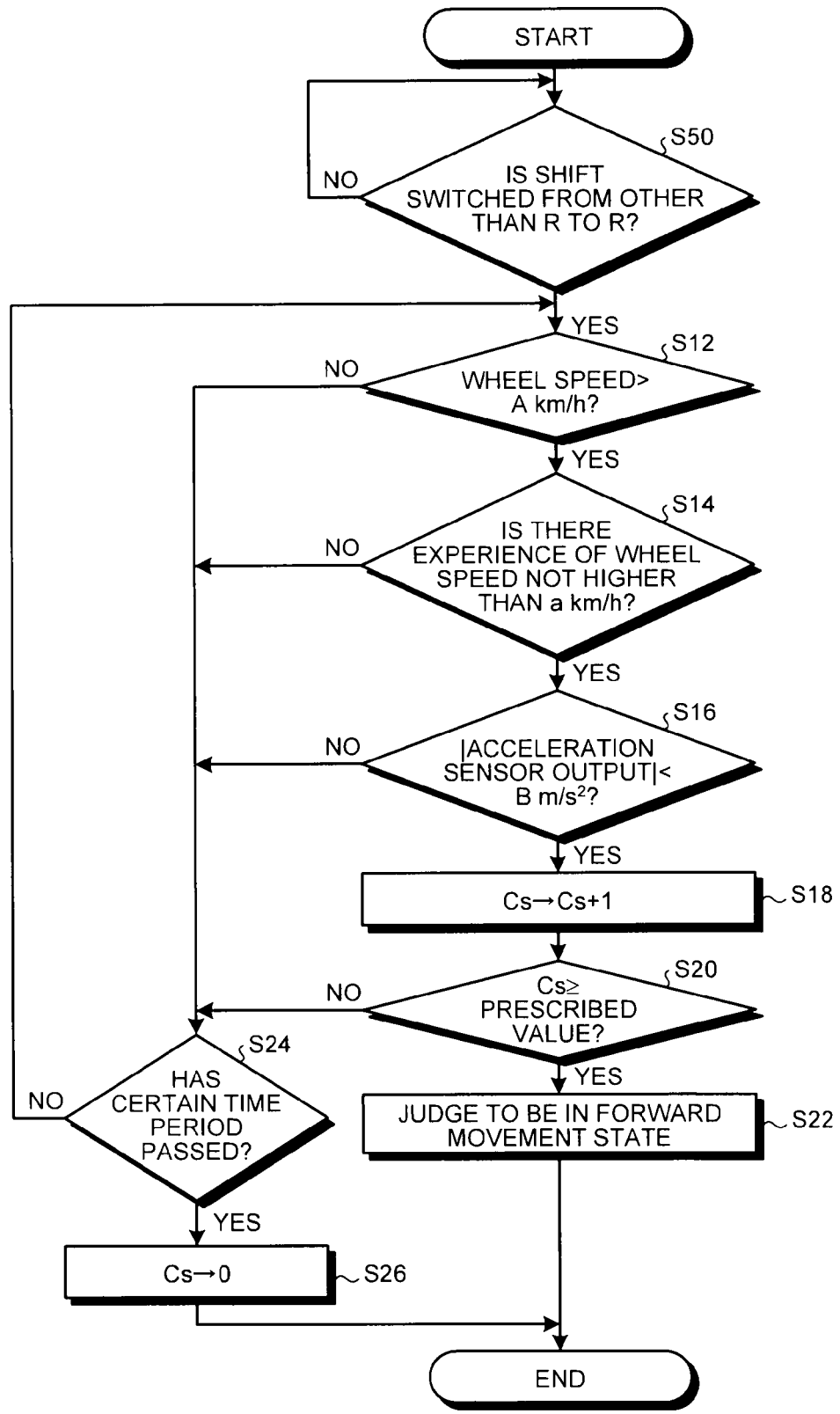
FIG. 5 is a flow diagram illustrating another example of the judging method by the vehicle state judging apparatus.

Although the case where the travel direction is switched from the state in which the vehicle moves backward to the state in which the vehicle moves forward is described in the example illustrated in FIG. 2, this is not a limitation, and it is possible to similarly control also in a case where the travel direction is switched from the state of the forward movement to the state of the backward movement. Another example of the judging method by the vehicle state judging apparatus is hereinafter described with reference to FIG. 5. Herein, FIG. 5 is a flow diagram illustrating another example of the judging method by the vehicle state judging apparatus. Meanwhile, the judging method illustrated in FIG. 5 is basically similar to the judging method illustrated in FIG. 2 except that the travel direction before the switching and after the switching are reversed, so that the description of the similar part is simplified and a characteristic feature of the judging method illustrated in FIG. 5 is herein described in detail.

The ECU 40 of the vehicle state judging apparatus 24 judges whether the shift position of the shift lever 20 is switched from the position other than the reverse position (R) such as the drive position (D) and the neutral position (N) to the reverse position (R) based on the detection value detected by the shift position sensor 41 at a step S50. When the ECU 40 judges that the shift position is switched to the reverse position at the step S50, the process goes to the step S12, and when the ECU 40 judges that the shift position is not switched, the ECU repeats the step S50. Hereinafter, since the processes at the steps S12, S14, S16, S18, S20, S22, S24 and S26 by the ECU 40 are similar to the above-described process in the flow diagram illustrated in FIG. 2, the description thereof is not repeated here. Meanwhile, the wheel speed A km/h, the wheel speed a km/h, and the acceleration B m/s$^2$, which are the references, may be the speed similar to or different from that at which the travel direction illustrated in FIG. 2 is switched to forward.

In this manner, also when the travel direction is switched from the forward direction to the backward direction, by judging the travel state as illustrated in FIG. 5, the travel direction can be judged with high degree of accuracy as in the case where the travel direction is switched from the backward direction to the forward direction. When the travel direction is switched from the forward direction to the backward direction also, by further judging whether the vehicle is in the stopped state as in the flow diagram illustrated in FIG. 4, the travel direction can be judged with high degree of accuracy even when the shift position is switched in the stopped state.

Industrial Applicability

As described above, the vehicle state judging apparatus and the vehicle state judging method according to the present invention are useful to judge the travel direction of the vehicle and are especially suitable for judging whether the travel direction of the vehicle is switched.

The invention claimed is:

1. A vehicle state judging apparatus for judging a travel state of a vehicle traveling by a prime mover, comprising:
    a wheel speed sensor that is provided on the vehicle and detects a wheel speed;
    a shift position sensor that detects a position of a shift lever; and
    a judging unit that judges a vehicle state based on detection values of the wheel speed sensor and the shift position sensor, wherein
    the judging unit judges that a travel direction of the vehicle is switched when the judging unit detects that the shift lever is switched from a position other than forward movement to a position of the forward movement or switched from a position other than backward movement to a position of the backward movement, detects that the wheel speed is not lower than a first reference speed, and further detects that the wheel speed becomes not higher than a second reference speed before the moment of detection.

2. The vehicle state judging apparatus according to claim 1, wherein the judging unit judges that the travel direction of the vehicle is switched when the judging unit further detects that the wheel speed becomes not higher than the second reference speed within a reference time range from the moment of detection.

3. The vehicle state judging apparatus according to claim 2, wherein the second reference speed is a wheel speed at which it can be considered that the vehicle stops.

4. The vehicle state judging apparatus according to claim 1, further comprising an acceleration sensor that detects acceleration acting on the vehicle, wherein
    the judging unit judges that the travel direction of the vehicle is switched when the judging unit further detects that the acceleration is not higher than reference acceleration.

5. The vehicle state judging apparatus according to claim 1, wherein the judging unit judges that the travel direction of the vehicle is switched when the judging unit detects a condition to judge that the travel direction of the vehicle is switched not less than a certain number of times within a certain time period.

6. A vehicle state judging method for judging a travel state of a vehicle, comprising:
    a detecting step that detects whether a shift lever is switched from a position other than forward movement to a position of the forward movement or switched from a position other than backward movement to a position of the backward movement;
    a wheel speed judging step that judges whether a wheel speed is not lower than a first reference speed when switching of the position is detected at the detecting step;
    a stop judging step that judges whether the wheel speed becomes not higher than a second reference speed before the wheel speed judging step when it is judged that the wheel speed is not lower than the reference speed at the wheel speed judging step;

an acceleration judging step that judges whether acceleration of the vehicle is not higher than reference acceleration when it is judged that the wheel speed becomes not higher than the second reference speed within a reference time range at the stop judging step; and a travel direction judging step that judges that a travel direction of the vehicle is switched when it is judged that the acceleration is not higher than the reference acceleration at the acceleration judging step.

7. The vehicle state judging method according to claim 6, wherein the stop judging step judges whether the wheel speed becomes not higher than the second reference speed within the reference time range before the wheel speed judging step.

8. The vehicle state judging method according to claim 6, wherein the acceleration judging step judges whether the acceleration of the vehicle is not higher than the reference acceleration until it is judged that the acceleration of the vehicle is not higher than the reference acceleration a certain number of times, and thereafter shifts to the stop judging step.

9. The vehicle state judging method according to claim 6, wherein the second reference speed is a wheel speed at which it can be considered that the vehicle stops.

10. The vehicle state judging apparatus according to claim 2, further comprising an acceleration sensor that detects acceleration acting on the vehicle, wherein the judging unit judges that the travel direction of the vehicle is switched when the judging unit further detects that the acceleration is not higher than reference acceleration.

11. The vehicle state judging apparatus according to claim 3, further comprising an acceleration sensor that detects acceleration acting on the vehicle, wherein the judging unit judges that the travel direction of the vehicle is switched when the judging unit further detects that the acceleration is not higher than reference acceleration.

12. The vehicle state judging apparatus according to claim 2, wherein the judging unit judges that the travel direction of the vehicle is switched when the judging unit detects a condition to judge that the travel direction of the vehicle is switched not less than a certain number of times within a certain time period.

13. The vehicle state judging apparatus according to claim 3, wherein the judging unit judges that the travel direction of the vehicle is switched when the judging unit detects a condition to judge that the travel direction of the vehicle is switched not less than a certain number of times within a certain time period.

14. The vehicle state judging apparatus according to claim 4, wherein the judging unit judges that the travel direction of the vehicle is switched when the judging unit detects a condition to judge that the travel direction of the vehicle is switched not less than a certain number of times within a certain time period.

15. The vehicle state judging method according to claim 7, wherein the acceleration judging step judges whether the acceleration of the vehicle is not higher than the reference acceleration until it is judged that the acceleration of the vehicle is not higher than the reference acceleration a certain number of times, and thereafter shifts to the stop judging step.

16. The vehicle state judging method according to claim 7, wherein the second reference speed is a wheel speed at which it can be considered that the vehicle stops.

17. The vehicle state judging method according to claim 8, wherein the second reference speed is a wheel speed at which it can be considered that the vehicle stops.

* * * * *